(12) United States Patent
Miyazono

(10) Patent No.: US 6,279,635 B1
(45) Date of Patent: Aug. 28, 2001

(54) HEAVY DUTY PNEUMATIC RADIAL TIRES WITH BEAD PORTION REINFORCING LAYER HAVING MULTIPLE INCLINATION ANGLES

(75) Inventor: Toshiya Miyazono, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/404,788

(22) Filed: Sep. 24, 1999

Related U.S. Application Data

(62) Division of application No. 09/094,574, filed on Jun. 12, 1998.

(30) Foreign Application Priority Data

Jun. 12, 1997 (JP) .................................................. 9-154894
Jun. 27, 1997 (JP) .................................................. 9-171632

(51) Int. Cl.[7] .................................................. B60C 15/00
(52) U.S. Cl. .......................... 152/539; 152/555; 152/543; 152/546
(58) Field of Search ...................... 152/553, 539, 152/554, 555, 549, 542, 543, 546, 551

(56) References Cited

U.S. PATENT DOCUMENTS

| | | | |
|---|---|---|---|
| 4,508,152 | * | 4/1985 | Sano ....................... 152/356 |
| 4,852,626 | * | 8/1989 | Tsukagoshi ............ 152/514 |
| 4,953,605 | * | 9/1990 | Kawamura ............. 152/541 |
| 5,151,140 | * | 9/1992 | Takagi ..................... 152/543 |

FOREIGN PATENT DOCUMENTS

| | | |
|---|---|---|
| 0465 190 A1 | 1/1992 | (EP) . |
| 59-109406 | 6/1984 | (JP) . |
| 59109406 | * 6/1984 | (JP) . |
| 59-216709 | 12/1984 | (JP) . |
| 1-26884 | 5/1989 | (JP) . |
| 401254409 | * 10/1989 | (JP) . |
| 1-254409 | 10/1989 | (JP) . |
| 03050003 | * 4/1991 | (JP) . |

OTHER PUBLICATIONS

Patent Abstracts of Japan, V15, N194, Jp 03 050003A, Mar. 4, 1991.
Patent Abstracts of Japan, V16, N467, JP 04 166405A, Jun. 12, 1992.

* cited by examiner

*Primary Examiner*—Michael W. Ball
*Assistant Examiner*—Justin Fischer
(74) *Attorney, Agent, or Firm*—Sughrue, Mion, Zinn, Macpeak & Seas, PLLC

(57) ABSTRACT

A heavy duty pneumatic radial tire has a light weight of a bead portion and an excellent bead portion durability and is provided with a bead portion reinforcing layer covering an outer surface of a carcass ply around a bead core, in which the bead portion reinforcing layer is comprised of a single rubberized steel cord layer or of two or three independent rubberized steel cord layer segments. In this case, the steel cords arranged in the bead portion reinforcing layer have an inclination angle of a given range with respect to a circumferential line of the tire.

5 Claims, 12 Drawing Sheets

FIG_8

FIG_9

FIG_13
PRIOR ART
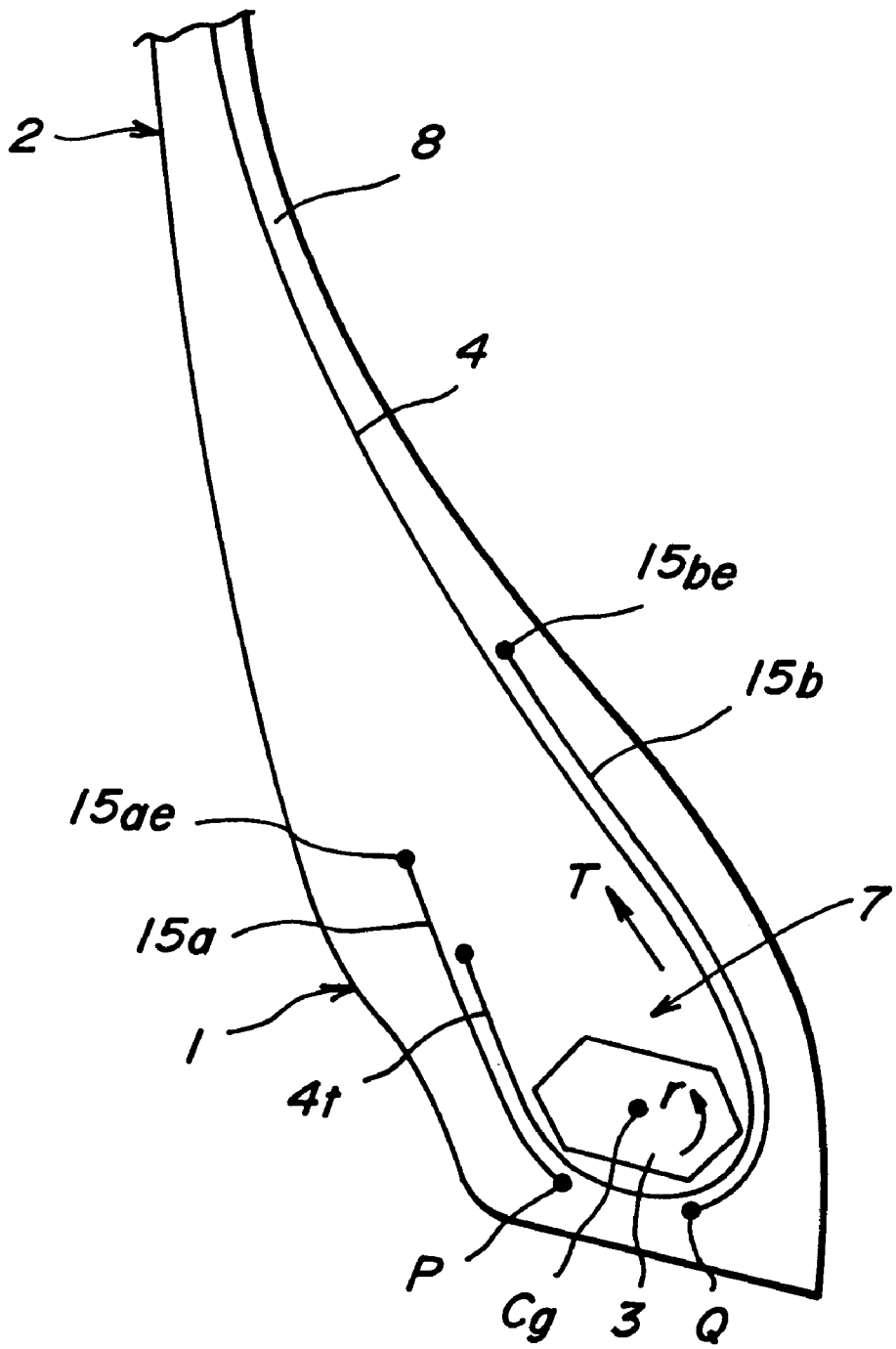

HEAVY DUTY PNEUMATIC RADIAL TIRES WITH BEAD PORTION REINFORCING LAYER HAVING MULTIPLE INCLINATION ANGLES

This is a divisional of application Ser. No. 09/094,574, filed Jun. 12, 1998, the disclosure of which is incorporated herein by reference.

BACKGROUND OF THE INVENTION

1. Field of the Invention

This invention relates to a heavy duty pneumatic radial tire, and more particularly to a heavy duty pneumatic tire for use in heavy vehicles such as truck, bus and the like capable of sufficiently developing excellent bead portion durability without additionally arranging extra reinforcing members in a bead portion for reducing the weight of the bead portion.

2. Description of Related Art

In the pneumatic radial tires used in heavy vehicles such as truck, bus and the like, there is a serious problem that failures in the bead portion typified by separation from a turnup end of a carcass ply and separation from an end of cord in a bead portion reinforcing cord layer are caused to obstruct a complete service life of a new tire and bring about troubles in repetitive recapped use. Up to the present, therefore, there are proposed and practiced various countermeasures for solving the above problem.

A large number of these countermeasures lie in the use of many bead portion reinforcing cord layers or the increase of volume in the bead portion as a whole for reducing falling-down of a bead portion connected to a ground contact region toward the outside of the tire during the running under a load as far as possible to reduce strain acting to an end of a bead portion reinforcing cord layer or a turnup end of a carcass, and hence they follow the increase of tire weight and the rise of cost. However, they are at a state not corresponding to current demands such as weight reduction, cost reduction and the like.

Further, these countermeasures are utterly impossible to meet demands of resource-saving and energy-saving and requirement of reducing production cost. As a result of examining a portion of the tire capable of reducing tire weight, there is no longer a portion other than a bead portion. For this end, it is attempted to prepare a trial tire for truck and bus by selecting a bead core as a most possible target for reducing the weight, decreasing the winding number of steel wires constituting the bead core, and also decreasing a weight of rubber for the enhancement of bead portion rigidity called as a stiffener rubber taperingly extending outward from an outer peripheral surface of the bead core in a radial direction of the tire, which is mounted onto a vehicle and subjected to an actual running test.

In this test, the trial tire inflated under a given internal pressure becomes large in so-called falling-down deformation under loading and hence a large "settling" phenomenon is caused in the bead core as the running distance of the tire becomes long. The whole shape of the bead portion is largely deformed from that of the new tire accompanied with the above phenomenon and consequently it has been confirmed that strain acting to a radially outward end of a bead portion reinforcing steel cord layer required for maintaining the durability of the bead portion is increased to cause separation failure.

In JP-B-1-26884 is disclosed a heavy duty pneumatic radial tire wherein a single metal cord reinforcing layer is disposed outside the turnup portion of the radial carcass ply and a cord arranging angle in an upper end portion of the reinforcing layer is not more than 20° with respect to the circumferential direction of the tire and a cord arranging angle in a region ranging from a start point of contacting with a flange of a rim toward a bead base is made larger by not less than 10° than the above angle at the upper end portion as a bead portion structure capable of maintaining and improving the durability even when the weight is reduced by decreasing the stiffener rubber likewise the above case.

Even in such a tire, however, it has been confirmed that the separation resistance is insufficient in the upper end portion of the metal (steel) cord. As a result of examinations on such a cause, it has been elucidated that the upper end portion of the metal cord reinforcing layer can not sufficiently follow the deformation at stepping-in side and kicking-out side of the ground contact region of the tire tread in the radial direction of the tire during the running under loading and hence a large strain is created in the upper end portion to cause the separation failure.

Another means for improving the bead portion durability without so increasing the tire weight is proposed in JP-A-59-216709. In this case, as shown in FIG. 13, a metal cord layer as a reinforcing layer for a bead portion 1 is divided at inside and outside of a bead core 3 into an outer metal cord layer (protection layer for end of turnup portion 4t) 15a and an inner metal cord layer (support reinforcing layer) 15b, respectively, noticing "settling" of the bead core in addition to falling-down of the bead portion. Further, modulus at 1% elongation of the layer 15a is made smaller than that of the layer 15b and an inclination cord angle of each layer with respect to the radial plane of the tire on a circumference passing an upper end of the layer is within a range of 45–70° at maximum (20–45° with respect to the circumference of the tire), whereby the improvement of the bead portion durability is attained.

Since the bead portion reinforcing layer is divided into the protection layer 15a for turnup 4t end and the support reinforcing layer 15b (division ends P, Q of the layers 15a, 15b), the restraint by the ends 15ae, 15be of the layers at positions contacting with a rim is considerably moderate as compared with a case of using a single layer, and the layers 15a, 15b are easy to follow the remarkable shearing deformation in the circumferential direction of the tire at both stepping-in and kicking-out sides of the tread during the running of the tire under loading, and hence the concentration of strain acting to an outer end portion of each layer in the radial direction of the tire is largely mitigated.

Recently, a tendency of forming a lower section profile of a heavy duty pneumatic radial tire, particularly truck or bus tire more proceeds and hence an internal air pressure becomes higher and conditions input to the bead portion becomes more severer. In the aforementioned division of the bead portion reinforcing layer into the metal cord layers 15a and 15b at inside and outside of the bead core 3, the clamping force to the metal cord layers 15a, 15b between the bead core and the flange and bead sheet of the rim is hardly expected as previously mentioned, so that both the metal cord layers 15a, 15b are easily moved in the bead portion 1 at a ground contact region during the running of the tire under loading, which simultaneously causes the following problems.

When the tire is inflated under a higher internal pressure, a large tension is applied to the carcass ply 4 as shown by an arrow T in FIG. 13. That is, the tension T is a force of drawing out the carcass ply 4 from the bead core 3 in a direction shown by the arrow. Particularly, when the bead portion 1 is fallen down toward the outside of the tire under loading, the carcass ply 4 acts to largely rotate the bead core 3 around a graphic center of gravity g at a section of the bead core in a direction shown by an arrow r together with the force T and the moving easiness of the metal cord layers 15a, 15b. This action is applied to the bead core 3 every one rotation of the tire and the temperature of the bead portion 1 becomes high during the running of the vehicle, so that "settling" deformation as a plastic deformation is caused in the bead core 3 and the deformation degree proceeds as the running distance of the tire becomes long.

Such a large "settling" deformation of the bead core 3 largely changes the sectional shape of the bead portion 1 from a new tire state. As a result, the deformation of the bead portion brings about such a inconvenience that the bead portion reinforcing metal cord layer 15a located outside the turnup portion 4t of the carcass ply largely diverts from an arrangement of previously minimizing strain acting to the outer end portion of the layer in the radial direction of the tire and hence a large strain is concentrated in the vicinity of the outer end 15ae of the metal cord layer 15a and the separation failure is apt to be caused in this end portion.

And also, even in a tire having a more reduced weight by decreasing the winding number of steel wires constituting the bead core, it has been confirmed that if it is intended to locate the division position between the metal cord layers 15a and 15b as a bead portion reinforcing layer in a position separated away outward from the periphery of the bead core 3 in the radial direction of the tire, the degree of "settling" deformation in the bead core becomes large, which brings about the same large change of the bead portion shape as in the above case and hence the separation failure is caused in the outer end portion of the metal cord layer and the given service life of the tire can not be attained.

SUMMARY OF THE INVENTION

It is, therefore, an object of the invention to provide a heavy duty pneumatic radial tire having a light weight and a bead portion durability equal to or more than that of the conventional heavy duty pneumatic radial tire even when the winding number of steel wires in the bead core is decreased and the volume of rubber in the bead portion, particularly stiffener rubber is decreased accompanied therewith irrespectively of a tube-containing tire or tubeless tire.

According to a first aspect of the invention, there is the provision of a heavy duty pneumatic radial tire comprising a carcass of one or more rubberized cord plies extending between a pair of bead cores each embedded in a bead portion and containing cords arranged along a plane inclusive of a rotating axial center of the tire, at least one of which plies being wound around the bead core from inside of the tire toward outside thereof to form a turnup portion, and a bead portion reinforcing layer comprised of a single rubberized steel cord layer covering a surface of the carcass ply over a region ranging from an outer position of the turnup portion in a radial direction of the tire along an outer surface of the turnup portion through the bead core up to an inside of the tire, in which an inclination angle of steel cord in the bead portion reinforcing layer with respect to a circumferential line of the tire is within a range of 22–35° in outermost end portions outside and inside the tire in the radial direction and an inclination angle of steel cord outside and inside of the tire in the vicinity of a straight line passing through a graphic center of gravity in the bead core at a section thereof and in parallel to the rotating axis of the tire is within a range of 5–50° added to the inclination angle range of the above outermost end portion.

This tire comprises a pair of sidewall portions connecting to the pair of bead portions, a tread portion extending between both the sidewall portions, a belt reinforcing the tread portion on an outer periphery of the carcass and comprised of two or more cross cord layers, preferably two or more two cross steel cord layers according to custom. When the carcass is one ply, it is adaptable to use a rubberized steel cord. And also, the cords of the carcass ply are arranged perpendicular or substantially perpendicular to an equatorial plane of the tire in the tread portion. The word "inclination angle with respect to circumferential line of the tire" used herein means an angle defined between tangents of circumferential line and steel cord axial line at an assumption intersect of circumferential line at a given position (assumption line) and the cord axial line.

In a preferable embodiment of the first aspect of the invention, the inclination angle of steel cord outside and inside of the tire in the vicinity of a straight line passing through a graphic center of gravity in the bead core at a section thereof and in parallel to the rotating axis of the tire is within a range of 5–30° added to the inclination angle range of the outermost end portion with respect to the circumferential line of the tire.

In the tire according to the invention, it is possible to add an organic fiber cord layer such as nylon cord layer or the like to the bead portion reinforcing layer so as to cope with a severer load or a requirement of increasing the recapping number among use conditions of the tire. For this purpose, it is favorable that one or more organic fiber cord layers are arranged around an outer surface of the bead portion reinforcing layer. In this case, it is desirable that a direction of arranging steel cords in the bead portion reinforcing layer is the same as a direction of arranging cords in the organic fiber cord layer.

Considering the productivity of the tire, it is favorable that a ratio of 100% modulus of a coating rubber for steel cord in the bead portion reinforcing layer to 100% modulus of a coating rubber for cord in the carcass ply is within a range of 0.6–1.0. On the other hand, considering the improvement of tire performances in addition to the tire productivity, it is desirable that the ratio of 100% modulus of a coating rubber for steel cord in the bead portion reinforcing layer to 100% modulus of a coating rubber for cord in the carcass ply is within a range of 0.6–0.9. In the other preferable embodiment of the first aspect of the invention, a group of arranging two or more steel cords side by side is used as an arrangement of steel cords in the bead portion reinforcing layer.

According to a second aspect of the invention, there is the provision of a heavy duty pneumatic radial tire comprising a carcass of one or more rubberized cord plies extending between a pair of bead cores each embedded in a bead portion and containing cords arranged along a plane inclusive of a rotating axial center of the tire, at least one of which plies being wound around the bead core from inside of the tire toward outside thereof to form a turnup portion, and a bead portion reinforcing layer comprised of separately independent rubberized steel cord layer segments covering the carcass ply inclusive of its turnup portion in the bead portion, in which said bead portion reinforcing layer is comprised of two independent rubberized steel cord layer segments arranged at outside and inside regions of the bead portion putting the bead core therebetween, and an outer end of the independent rubberized steel cord layer segment located at the outside region of the bead portion in the radial direction of the tire extends upward over an end of the turnup portion of the carcass ply, and opposed ends of the two rubberized steel cord layer segments are arranged so as to adjoin each other in the vicinity of the bead core, and an inclination angle of steel cord in the two independent rubberized steel cord layer segments arranged at outside and inside regions of the bead portion putting the bead core therebetween with respect to a circumferential line of the tire is within a range of 15–30° in an outer end portion of each of the two rubberized steel cord layer segments in the radial direction of the tire and an inclination angle of steel cord in an inner end portion in the radial direction of the tire is within a range of 35–60° in at least one of the two rubberized steel cord layer segments.

The term "vicinity" in the vicinity of the bead core means a partial gathering of all points wherein a distance from an arbitrary point I is smaller than a certain value in metric space, while the term "arbitrary point I" means all points existing on the bead core at section thereof. And also, the term "certain value of the distance from the point I" means a value that a distance measured from a point on a surface of the bead core in all directions is within a range of 0.5–20 mm. Furthermore, the term "adjoin each other" used herein includes a case of slightly separating away the opposed ends from each other in addition to a case of contacting the opposed ends with each other.

In a preferable embodiment of the second aspect of the invention, the opposed ends of the two rubberized steel cord layer segments as the bead portion reinforcing layer are butted to each other. In this case, the butting position between the opposed ends is existent around the bead core.

In another preferable embodiment of the second aspect of the invention, the steel cords of the two layer segments located at the outside and inside regions of the bead portion are arranged in the same inclining direction with respect to a radius line of the tire.

In the other preferable embodiment of the second aspect of the invention, the steel cords of the two layer segments are arranged in an inclining direction opposite to each other with respect to a radius line of the tire.

In a still further preferable embodiment of the second aspect of the invention, when a 15° drop center rim or a wide-width flat base rim is used, the adjoining position between the opposed ends of the two rubberized steel cord layer segments as the bead portion reinforcing layer is existent between a straight line passing through a graphic center of gravity in the bead core at section thereof and perpendicular to the rotating axis of the tire and a normal line drawn from an outermost end of a surface of the bead portion contacting with a flange of a rim in the radial direction of the tire to the carcass ply facing the inside of the tire. This type of the tire is a radial ply tire for truck and bus, in which a tire using the 15° drop center rim is a tubeless tire and a tire using the wide-width flat base rim as an approved rim is a tube-containing tire. Moreover, the term "outermost end in the radial direction of the tire" used herein means a position when the tire is assembled onto the approved rim and inflated under a maximum air pressure corresponding to a maximum load capacity of the tire defined in "air pressure-load capacity table" according to the above standard.

According to a third aspect of the invention, there is the provision of a heavy duty pneumatic radial tire comprising a carcass of one or more rubberized cord plies extending between a pair of bead cores each embedded in a bead portion and containing cords arranged along a plane inclusive of a rotating axial center of the tire, at least one of which plies being wound around the bead core from inside of the tire toward outside thereof to form a turnup portion, and a bead portion reinforcing layer comprised of separately independent rubberized steel cord layer segments covering the carcass ply inclusive of its turnup portion in the bead portion, in which said bead portion reinforcing layer is comprised of three independent rubberized steel cord layer segments consisting of an inner reinforcing layer segment arranged at an inside region side the carcass ply facing the inside of the tire, an outer reinforcing layer segment arranged at an outside region side the turnup portion of the carcass ply, and a middle reinforcing layer segment arranged around the bead core between the inner reinforcing layer segment and the outer reinforcing layer segment, and an outer end of the outer reinforcing layer segment in the radial direction of the tire extends over an end of the turnup portion of the carcass ply, and opposed ends among the three rubberized steel cord layer segments are arranged so as to adjoin each other in the vicinity of the bead core, and an inclination angle of steel cord in the bead portion reinforcing layer with respect to a circumferential line of the tire is within a range of 15–30° at an outer end portion of each of the outer and inner reinforcing layer segments in the radial direction of the tire and within a range of 35–60° at an inner end portion thereof and an inclination angle of steel cord in the middle reinforcing layer segment is made larger than the inclination angle of steel cord at the inner end portion of each of the above outer and inner reinforcing layer segments.

In a preferable embodiment of the third aspect of the invention, the steel cords in at least two layer segments among the three reinforcing layer segments as the bead portion reinforcing layer are arranged in the same inclining direction with respect to a radius line of the tire.

In another preferable embodiment of the third aspect of the invention, a group of arranging two or more steel cords side by side is used as a steel cord in at least one layer segment among the three reinforcing layer segments as the bead portion reinforcing layer.

In a preferable embodiment of the second and third aspects of the invention, a coating rubber for steel cords in a layer segment arranged in at least the outer region of the bead portion has 100% modulus smaller than that of a coating rubber for cords in the carcass ply.

In another preferable embodiment, at least one organic fiber cord layer is arranged so as to cover an outer surface of the bead portion reinforcing layer when at least one of load and running speed as a service condition is severe.

BRIEF DESCRIPTION OF THE DRAWINGS

The invention will be described with reference to the accompanying drawings:

FIG. 13 is a diagrammatically section view of a main part of the conventional tire.

DESCRIPTION OF PREFERRED EMBODIMENTS

Figure 1:
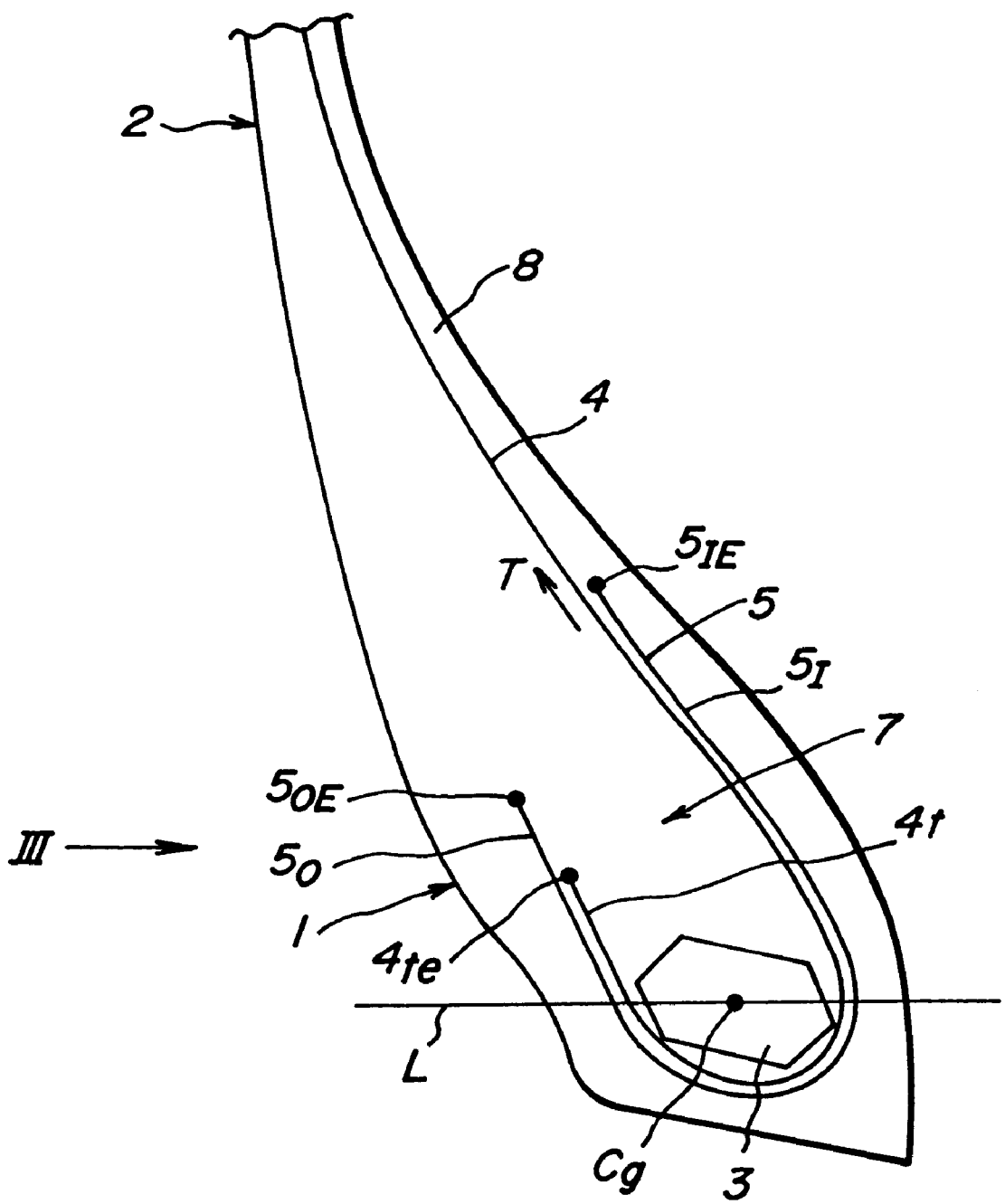
FIG. 1 is a diagrammatically section view of a main part of a first embodiment of the tire according to the first aspect of the invention.
Figure 2:
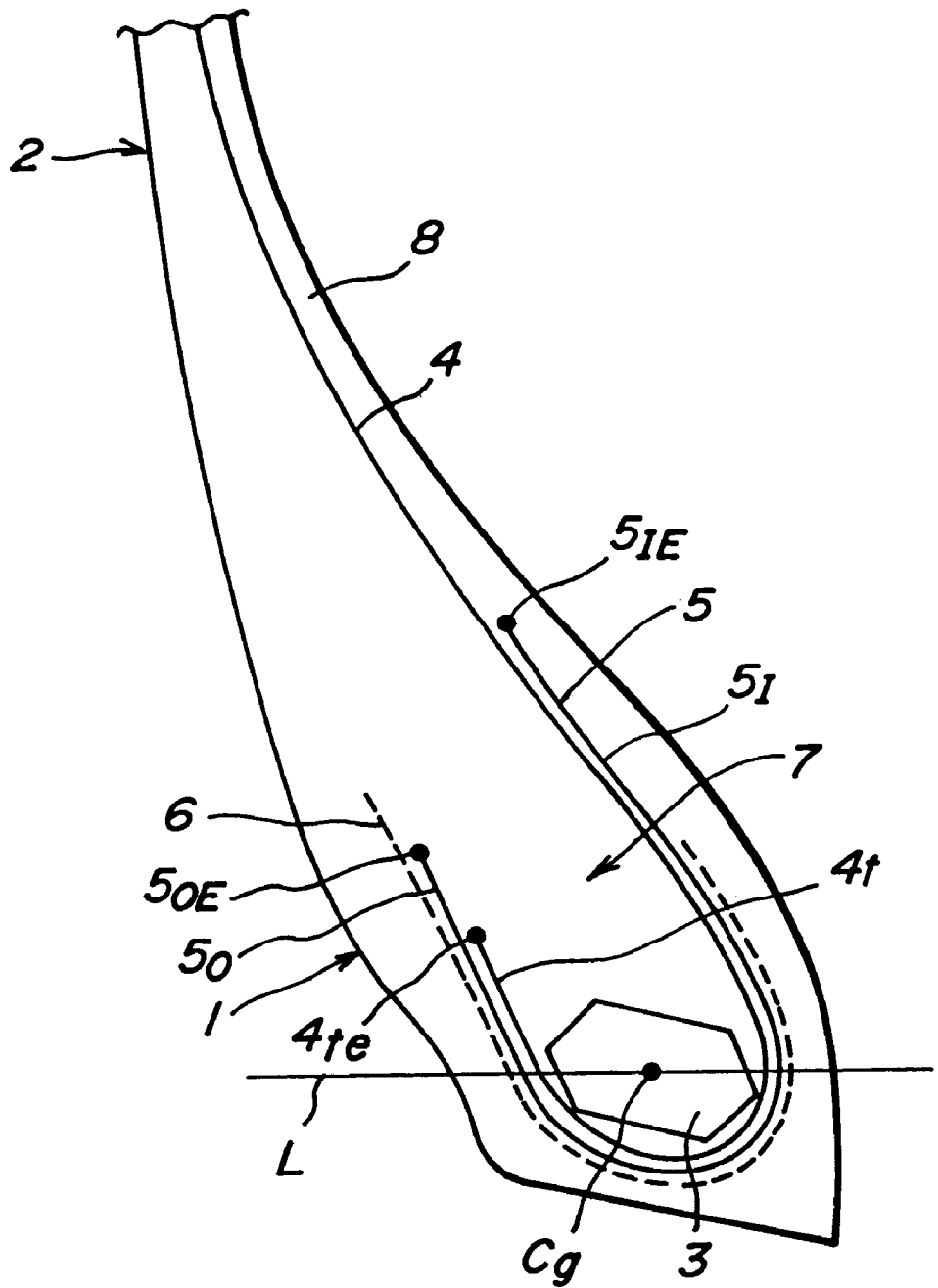
FIG. 2 is a diagrammatically section view of a main part of a second embodiment of the tire according to the first aspect of the invention.
Figure 3:
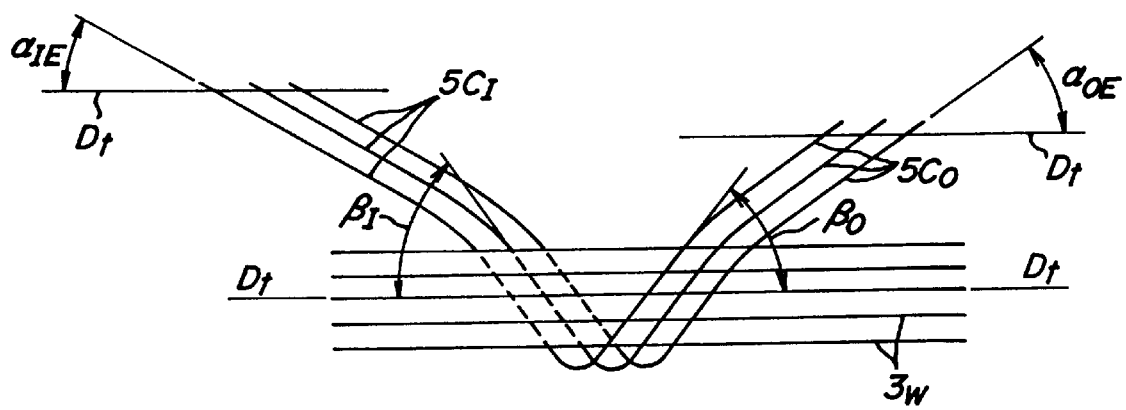
FIG. 3 is an opened-up view of the main part of the tire from an arrow III in FIG. 1.

FIGS. 1 and 2 are diagrammatically left-half radial sections of two embodiments of a main part of the tubeless heavy duty pneumatic radial tire according to the first aspect of the invention, respectively, and FIG. 3 is a schematic view illustrating arrangements of cords in the bead portion reinforcing layer and steel wires in the bead core opened-up from an arrow III shown in FIG. 1.

In FIGS. 1 and 2, a pair of bead portions 1 are connected to a pair of sidewall portions 2 and also a tread portion (not shown) is extended between outer ends of the sidewall portions 2 in a radial direction of the tire. A carcass 4 is at least one rubberized cord ply (one ply in the illustrated embodiment) toroidally extending between a pair of bead cores 3 embedded in the bead portions 1 and containing, for example, steel cord arranged along a plane inclusive of a rotating axial center of the tire, which is wound around the bead core from inside of the tire toward outside thereof to form a turnup portion 4t.

The bead portion 1 is provided with a bead portion reinforcing layer 5 comprised of a single rubberized steel cord layer (hereinafter referred to as a wire chafer). The wire chafer 5 extends from an outer position exceeding upward over an upper end 4te of the turnup portion 4t in the radial direction along an outer surface of the turnup portion 4t around the bead core 3 up to an inside region of the tire of a position over at least a maximum outer diameter of the bead core 3 so as to cover an outer surface of the carcass ply 4. In the embodiment of FIG. 2, one or more organic fiber cord layers 6 (one layer in the illustrated embodiment), for example, a nylon cord layer (hereinafter referred to as a nylon chafer) is further disposed along an outer surface of the wire chafer 5. Moreover, each of the tires shown in FIGS. 1 and 2 is provided with a stiffener rubber 7 and an innerliner 9 made from an air-impermeable rubber.

For convenience' sake, the wire chafer 5 is divided into an outer portion $5_O$ and an inner portion $5_I$. As shown in FIG. 3, when steel cords in the outer portion $5_O$ and steel cords in the inner portion $5_I$ are represented by symbols $5C_O$ and $5C_I$, respectively, an inclination angle $\alpha_{OE}$ of the cord $5C_O$ in the vicinity of an end $5_{OE}$ of the outer portion $5_O$ with respect to a circumferential line Dt of the tire and an inclination angle $\alpha_{IE}$ of the cord $5C_I$ in the vicinity of an end $5_{IE}$ of the inner portion $5_I$ with respect to a circumferential line Dt of the tire are within a range of 22–35°, respectively. In brief, this means that the end portion of each of the cords $5C_O$ and $5C_I$ is at a laid down state with respect to the circumferential line Dt of the tire.

In this connection, assuming a straight line L passing through a graphic center of gravity Cg in section of the bead core 3 and in parallel to a rotating axis of the tire as shown in FIGS. 1 and 2, it is required that an inclination angle $\beta_O$ of the cord $5C_O$ in the outer portion $5_O$ near to the straight line L with respect to the circumferential line Dt of the tire satisfies a relation of $\beta_O=(\alpha_{OE}+5°)\sim(\alpha_{OE}+50°)$ to the inclination angle $\alpha_{OE}$ in order to achieve the object of the invention. Preferably, it is $\beta_O=(\alpha_{OE}+5°)\sim(\alpha_{OE}+30°)$.

Similarly, it is required that an inclination angle $\beta_I$ of the cord $5C_I$ in the inner portion $5_I$ near to the straight line L with respect to the circumferential line Dt of the tire satisfies a relation of $\beta_I=(\alpha_{IE}+5°)\sim(\alpha_{IE}+50°)$ to the inclination angle $\alpha_{IE}$ in order to achieve the object of the invention. Preferably, it is $\beta_I=(\alpha_{IE}+5°)\sim(\alpha_{IE}+30°)$.

This means that the cords $5C_O$ and $5C_I$ located in the vicinity of the straight line L are at a more stand-up state with respect to the circumferential line Dt of the tire.

In order to obtain the distribution of the above inclination angle in the wire chafer 5, it is favorable that an uncured material previously subjected to a work for giving an angle difference between a central portion and each side portion in the widthwise direction is used as the wire chafer 5.

In the illustrated embodiments, the bead core 3 has a hexagonal shape in section formed by helically winding a steel wire 3w (see FIG. 3, circular section) covered with a coating rubber of a very thin gauge at an uncured stage in a given winding number (so-called hexagonal bead core). And also, so-called rectangular bead core formed by repeatedly winding and laminating a steel wire 3w having a rectangular shape at section or a peculiar bead core formed by repeatedly winding and laminating a steel wire 3w having a hexagonal shape at section may be used as the bead core 3 according to the invention.

When the tire is inflated under a given air pressure, for example, a maximum air pressure corresponding to a maximum load capacity, tension shown by an arrow T in FIGS. 1 and 2 is applied to the carcass 4. This tension is created in any tires though there is a difference in the degree of tension in accordance with the kind of the tire. Particularly, in case of truck-bus tires used under a high internal pressure of 7.25–9.0 kgf/cm² (cold state), a large tension T is inevitably applied to the carcass 4 and is a force acting to pull out the carcass 4 in the direction of arrow T. Therefore, the carcass 4 inflated under a given air pressure causes a force for rotating the bead core 3 (rotational moment around the graphic center of gravity Cg) based on the above pulling-out force, whereby the bead core 3 is intended to rotate around the graphic center of gravity Cg. When a given load is applied to the tire, tension of the carcass 4 in the bead portion 1 becomes larger and hence the rotating force to the bead core 3 is further increased.

In addition to the rotating force acting to the bead core, the sectional shape at a new stage of the bead core as a gathering body of steel wires can not be maintained due to temperature rise through a great amount of heat generation in the bead portion during the running of the tire under loading and hence a large deformation is caused in the bead core. Since this deformation is irreversible, the bead core shows a large "settling" state and the shape of the bead portion as a whole is deformed accompanied therewith, which produces a large strain in an outer end portion of the wire chafer during the running of the tire under loading and finally causes a separation failure. In other words, the large plastic deformation of the bead core frequently brings about the occurrence of separation failure.

In order to control the plastic deformation of the bead core against the rotating force acting to the bead core, the number of steel wires constituting the bead core is increased or a thick-diameter steel wire is used to make large the sectional shape of the bead core in the conventional tire, whereby torsional rigidity around the graphic center of gravity (Cg in FIGS. 1 and 2) required for the deformation control is given to the bead core. In this case, however, it is obliged to increase the tire weight and the cost.

On the contrary, according to the invention, inclination angles $\alpha_{OE}$, $\alpha_{IE}$ in end portions of steel cords $5C_O$, $5C_I$ of the outer portion $5_O$ and inner portion $5_I$ as a wire chafer 5 with respect to the circumferential line Dt and inclination angles $\beta_O$, $\beta_I$ of these steel cords in the vicinity of the straight line L with respect to the circumferential line Dt satisfy $\beta_O=(\alpha_{OE}+5°)\sim(\alpha_{OE}+50°)$, preferably $\beta_O=(\alpha_{OE}+5°)\sim(\alpha_{OE}+30°)$ and $\beta_I=(\alpha_{IE}+5°)\sim(\alpha_{IE}+50°)$, preferably $\beta_1=(\alpha_{IE}+5°)\sim(\alpha_{IE}+30°)$, which can first contribute to improve the rigidity of the bead core 3 around the graphic center of gravity Cg. Further, positions of crossing the cords of the carcass 4 with the steel cords $5C_O$, $5C_I$ of the wire chafer 5 around the bead core 3 can be increased to diminish the pulling-out force acting to the carcass 4 in the direction of arrow T under the inflation of a given air pressure. As a result, the rotation of the bead core 3 around the graphic center of gravity Cg can be controlled by the synergistic action of both the above features.

As mentioned above, according to the invention, the quantity of plastic deformation of the bead core 3 during the running of the tire under loading can largely be decreased, so that the deformation of the shape in the bead portion is very slight even when the wire amount of the bead core 3 is decreased. Therefore, strain in the vicinity of the end $5_{OE}$ of the wire chafer 5 can be decreased during the running of the tire under loading even in the reduction of the tire weight to improve the resistance to separation failure.

When the inclination angle $\alpha_{OE}$, $\alpha_{IE}$ is less than 22°, the deformation quantity along the circumference of the tire becomes large at the stepping-in side and kicking-out side of the ground contact region during the running of the tire under loading and a large strain is applied to the vicinity of the end $5_{OE}$ of the wire chafer 5 to cause the separation failure, while when it exceeds 35°, a zone ranging from the bead portion 1 to the sidewall portion 2 largely fall down outward in the ground contact region and hence a large strain is applied to the vicinity of the end $5_{OE}$ of the wire chafer 5 to cause the separation failure likewise the above case.

When the difference of inclination angle $(\beta_O-\alpha_{OE})$, $(\beta_I-\alpha_{IE})$ is less than 5°, the effect of decreasing the quantity of plastic deformation of the bead core 3 is slight, which interferes with the achievement of the object of the invention, while when it exceeds 50°, a large repetitive stress is applied to the steel cord $5C_O$, $5C_I$ in the wire chafer 5 during the running of the tire under loading and there is a fear of causing the breakage of the cord itself.

When the tire is used under a mild condition that the plastic deformation quantity of the bead core 3 is relatively small, for example, when one or more nylon chafers 6 are only used, if the wire chafer 5 is used instead of the nylon chafer 6, the upper limit of the inclination angle difference $(\beta_O-\alpha_{OE})$, $(\beta_I-\alpha_{IE})$ may be 30°.

The tire of FIG. 2 further added with the nylon chafer 6 is adaptable to a case of further improving the bead portion durability under a use condition of a larger load or under a condition of requiring many recapping number. In this case, it is favorable to meet the cord inclining direction of the nylon chafer 6 with the cord inclining direction of the wire chafer 5, which is effective to reduce strain in the vicinity of the end $5_{OE}$ of the wire chafer 5 produced during the running of the tire under loading.

Since the wire chafer 5 including the vicinity of its end $5_{OE}$ exhibits an approximately constant strain deformation during the running of the tire under loading, it is effective that a ratio of 100% modulus $M_{100W}$ (kgf/cm$^2$) of a coating rubber for cords of the wire chafer 5 to 100% modulus $M_{100C}$ (kgf/cm$^2$) of a coating rubber for cords of the carcass ply 4 ($M_{100W}/M_{100C}$) is within a range of 0.6–1.0 in case of considering the tire productivity, and the ratio is advantageous to be within a range of 0.6–0.9 in case of more improving the tire performances. When the ratio is within the above range, stress applied to the vicinity of the end $5_{OE}$ in the wire chafer 5 is mitigated but also shearing stress produced between the wire chafer 5 and the turnup portion 4t is mitigated, whereby the occurrence of cracks from the end $5_{OE}$ can be controlled and also the occurrence of separation between the wire chafer 5 and the turnup portion 4t can be prevented to largely contribute to the improvement of the bead portion durability.

As a modified embodiment of the wire chafer 5, it is useful to use so-called cord groups formed by arranging two or more steel cords side by side along the surface of the chafer. In this case, even if crack is produced in the end $5_{OE}$ of the steel cord, the crack grows along the axis of the cord for the present and hence a time of connecting the cracks to each other in the circumferential direction can considerably be delayed to largely prolong the running distance of the tire until the occurrence of separation failure.

Although the above is described with respect to the tubeless tire for truck and bus using the 15° drop center rim, it is of course applied to a tube-containing tire using a wide-width flat base rim.

Figure 7:
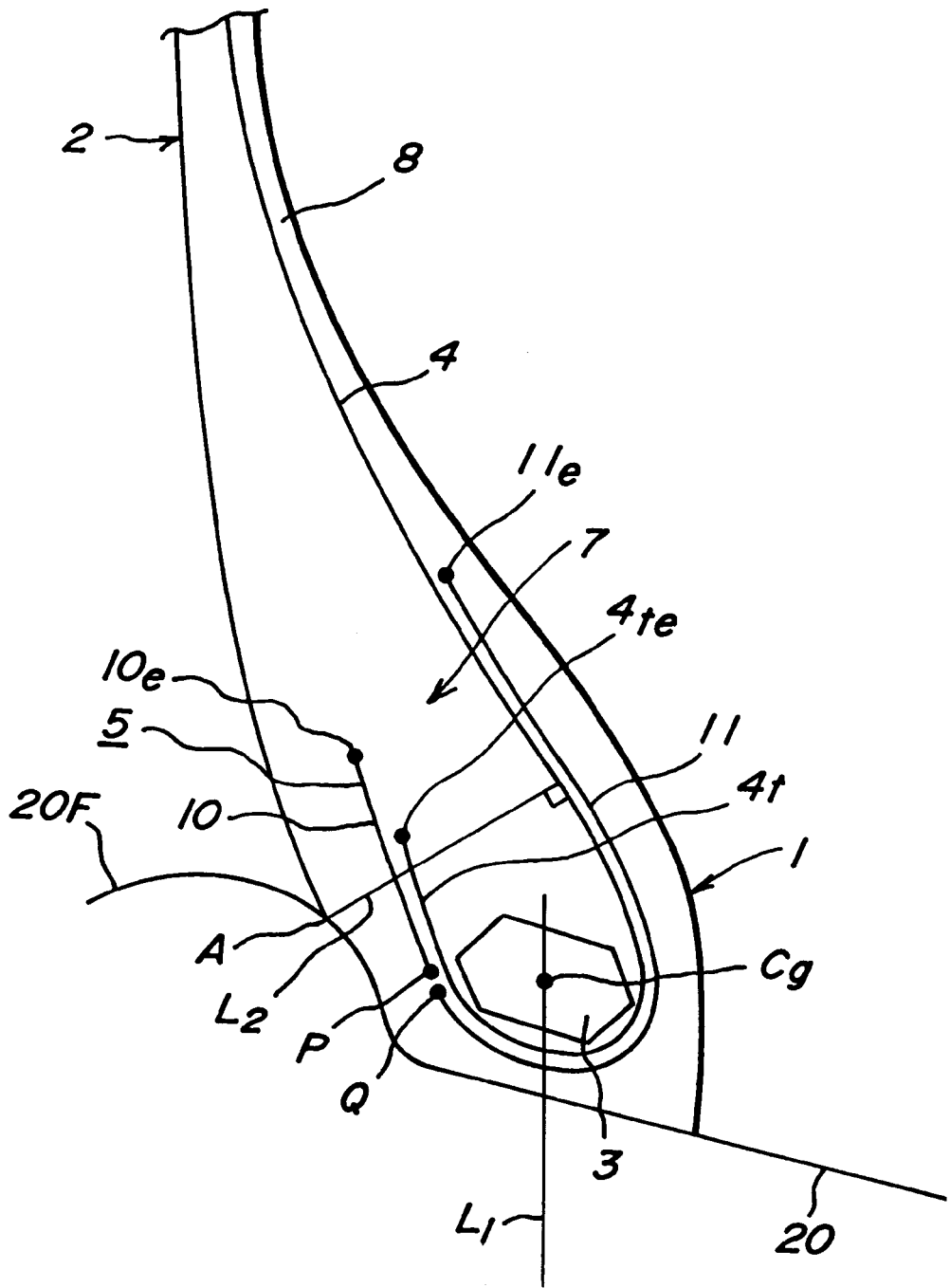
FIG. 7 is a diagrammatically section view of a main part of a fourth embodiment of the tire according to the second aspect of the invention.
Figure 8:
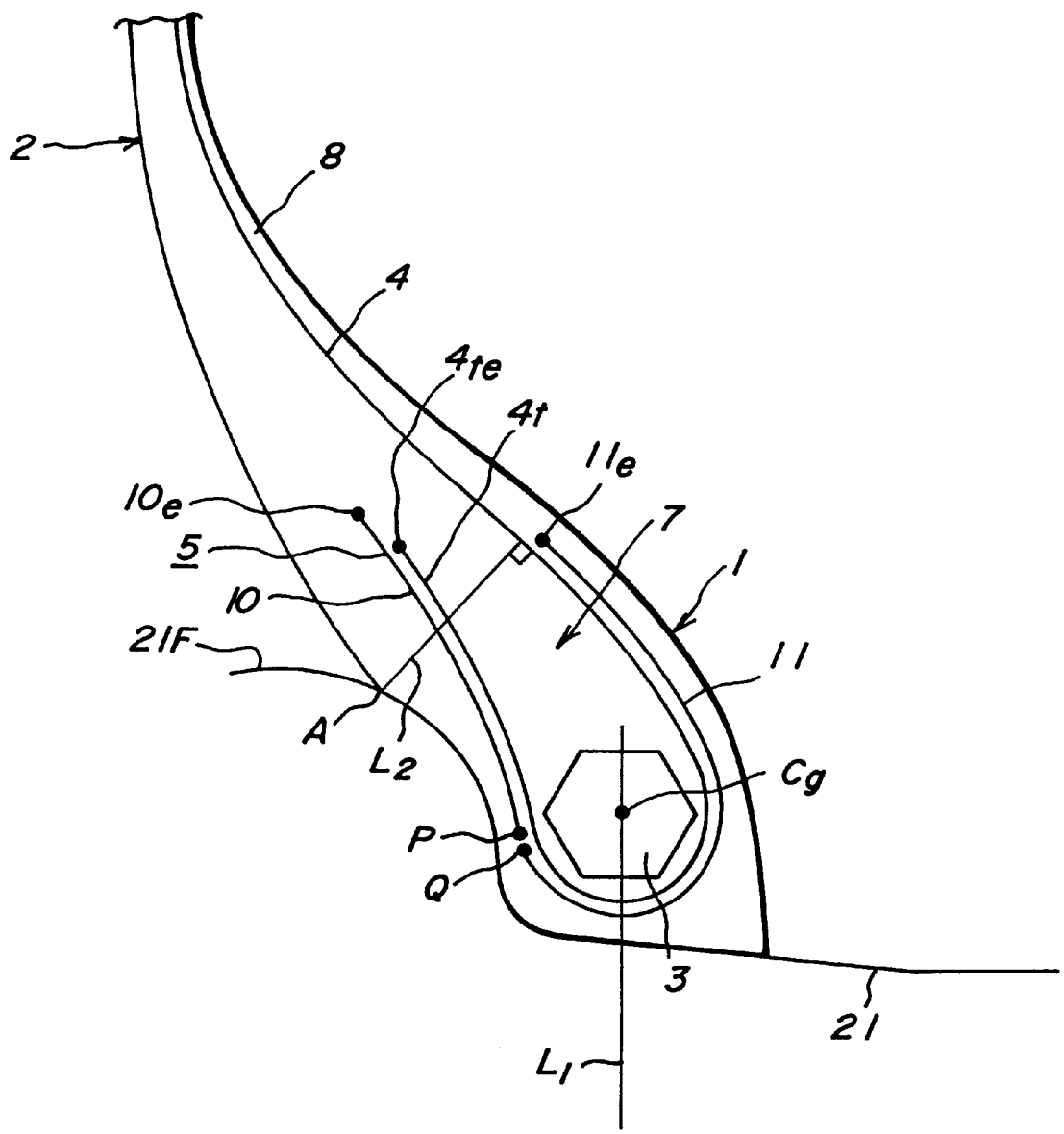
FIG. 8 is a diagrammatically section view of a main part of a fifth embodiment of the tire according to the second aspect of the invention.
Figure 9:
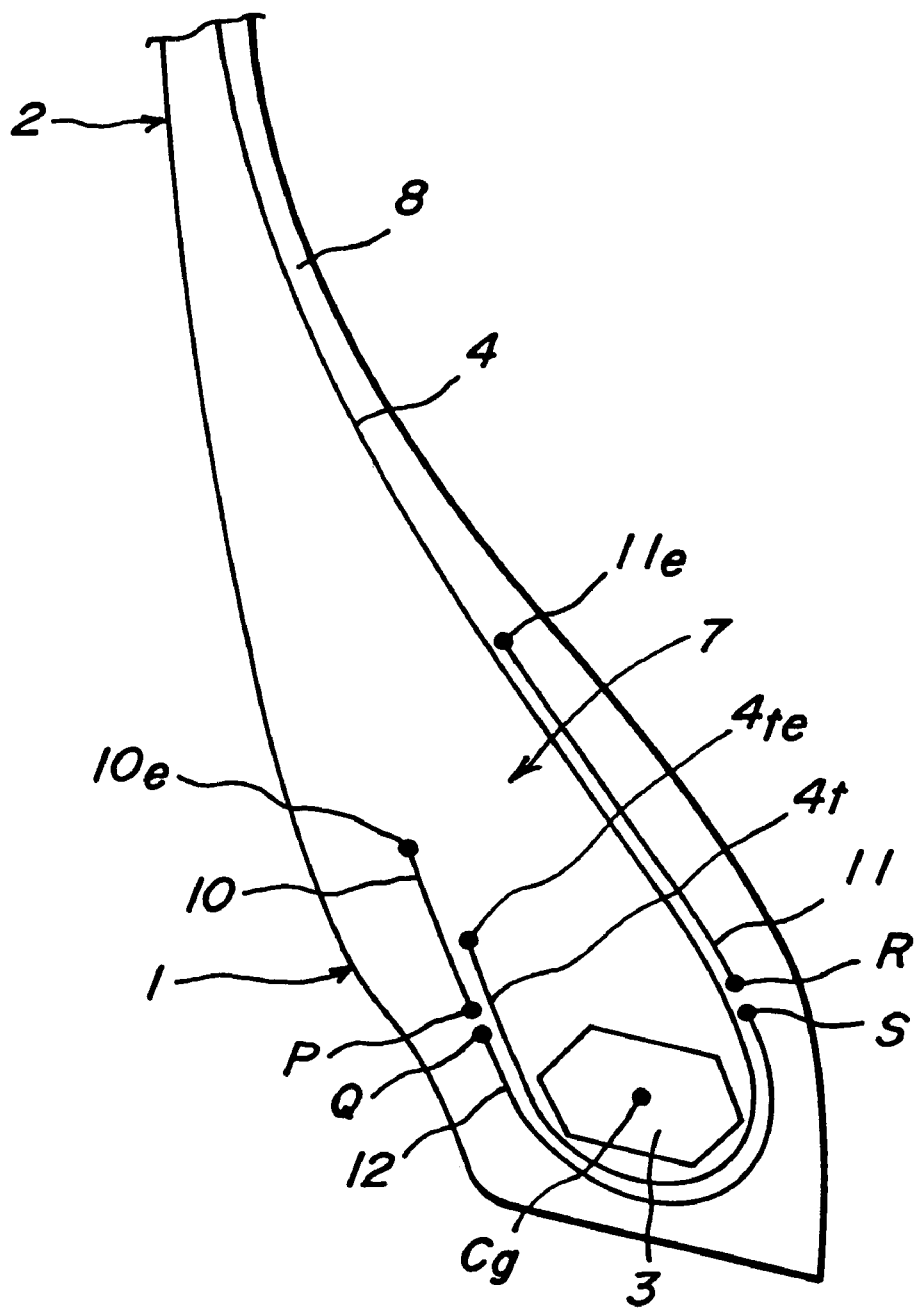
FIG. 9 is a diagrammatically section view of a main part of a first embodiment of the tire according to the third aspect of the invention.
Figure 10:
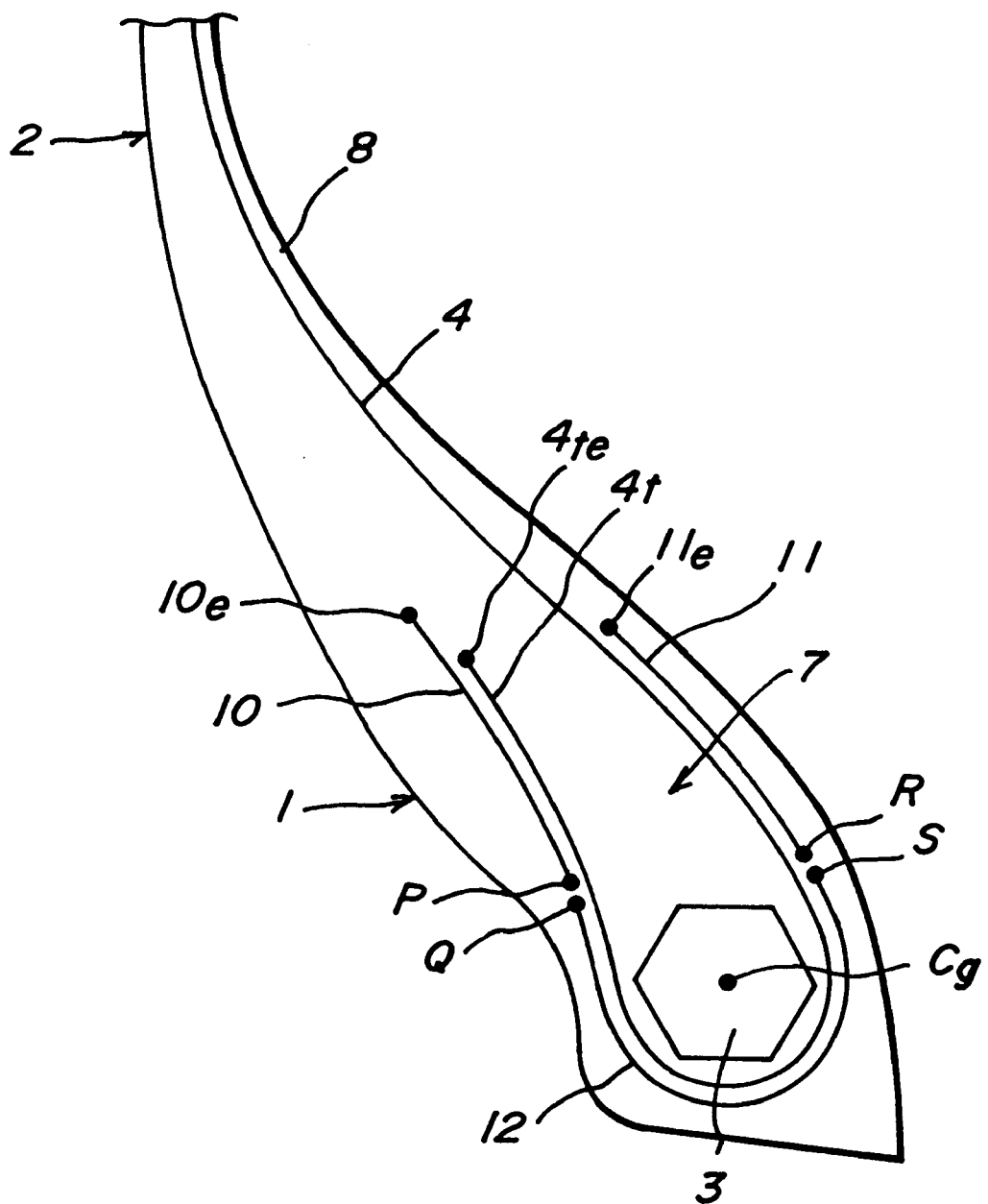
FIG. 10 is a diagrammatically section view of a main part of a second embodiment of the tire according to the third aspect of the invention.

Then, various embodiments of the tire according to the second aspect of the invention are shown in FIGS. 4–8, while two embodiments of the tire according to the third aspect of the invention are shown in FIGS. 9 and 10, respectively. In these figures, the same parts are represented by the same numerals and symbols as in the embodiments according to the first aspect of the invention.

The bead portion 1 shown in FIGS. 4–8 is provided with two independent rubberized steel cord layer segments 10, 11 as a bead portion reinforcing layer 5, while the bead portion 1 shown in FIGS. 9–10 is provided with three independent rubberized steel cord layer segments 12, 13, 14 as a bead portion reinforcing layer 5.

In the bead portion reinforcing layer 5 shown in FIGS. 4–8, the two independent rubberized steel cord layer segments 10 and 11 are arranged at outside and inside regions of the bead portion 1 putting the bead core 3 therebetween, in which the rubberized steel cord layer segment 10 mainly located at the side of the turnup portion 4t is called as an outer reinforcing layer and the rubberized steel cord layer segment 11 mainly located at the side of the carcass ply 4 facing the inside of the tire is called as an inner reinforcing layer. In the bead portion reinforcing layer 5 shown in FIGS. 9–10, the three rubberized steel cord layer segments 10, 11 and 12 are arranged in the bead portion 1 inclusive of the bead core 3, in which the rubberized steel cord layer segment 10 located outside the turnup portion 4t is called as an outer reinforcing layer, and the rubberized steel cord layer segment 11 located inside the carcass ply 4 facing the inside of the tire is called as an inner reinforcing layer, and the rubberized steel cord layer segment 12 located around the bead core 3 is called as a middle reinforcing layer.

Although the outer reinforcing layer 10, the inner reinforcing layer 11 and further the middle reinforcing layer 12 are independent, they are arranged so as to adjoin each other as they are a single continuous layer from the inside of the carcass ply 4 in the tire through the outside of the bead core 3 toward the outside of the turnup portion 4t. Particularly, the outer reinforcing layer 10 located at the outside region of the bead portion 1 extends outward over an end 4te of the turnup portion 4t along the turnup portion of the carcass ply 4 in the radial direction of the tire.

In these embodiments, it is required that the opposed ends of the outer and inner reinforcing layers 10, 11 shown in FIGS. 4–8, and the opposed ends of the outer, inner and middle reinforcing layers 10, 11, 12 shown in FIGS. 9–10 are arranged in the vicinity of the bead core 3 so as to adjoin each other. As shown in FIGS. 4–8, an end P of the outer reinforcing layer 10 is adjoined to an end Q of the inner reinforcing layer 11. Such an adjoining relation of the opposed ends means a case of butting these opposed ends to each other and a case of slightly separating these opposed ends from each other. For facilitating the understanding of the above relation, the case of slightly separating the opposed ends from each other is shown in all of FIGS. 4–10.

Figure 4:
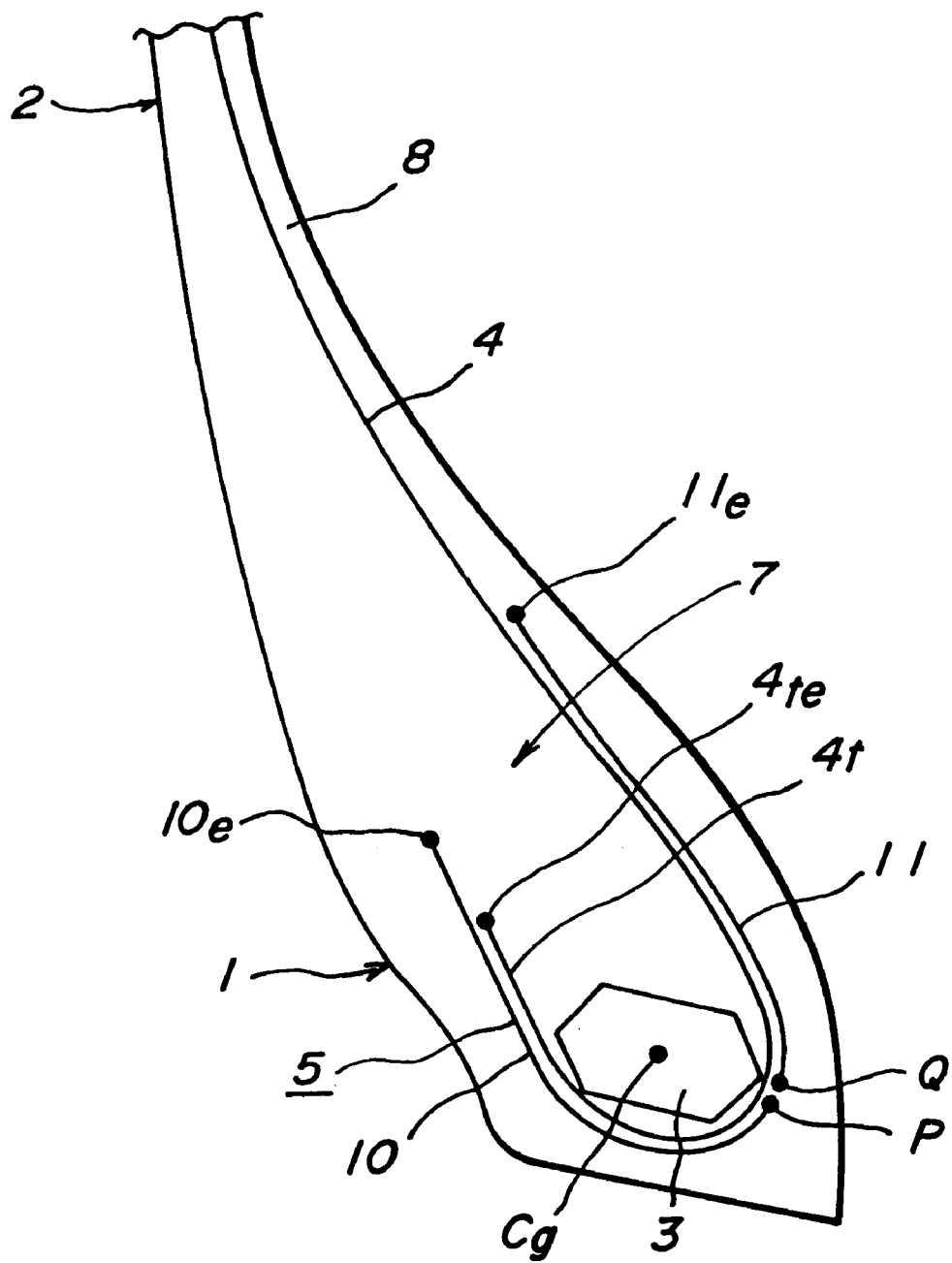
FIG. 4 is a diagrammatically section view of a main part of a first embodiment of the tire according to the second aspect of the invention.
Figure 5:
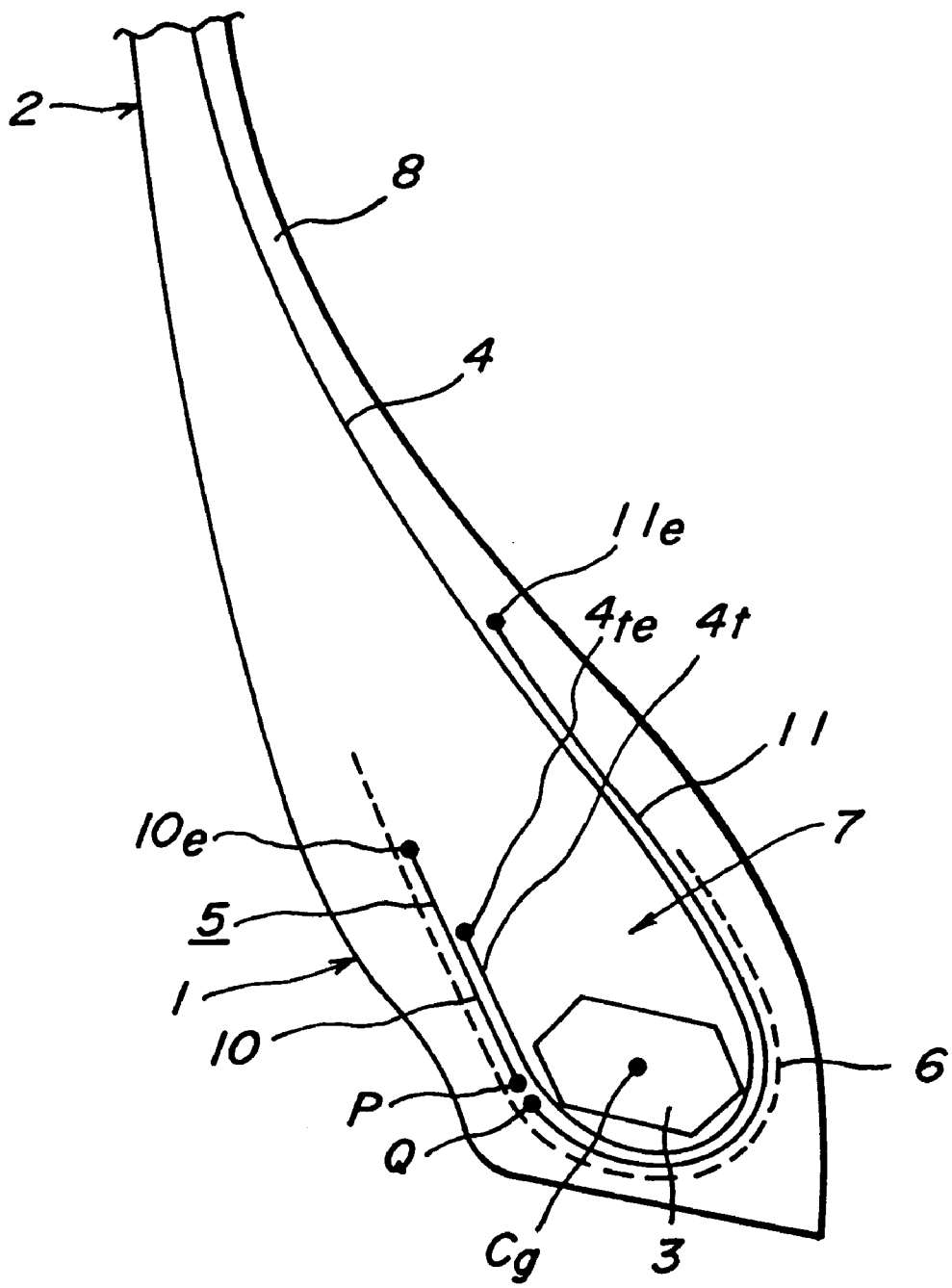
FIG. 5 is a diagrammatically section view of a main part of a second embodiment of the tire according to the second aspect of the invention.
Figure 6:
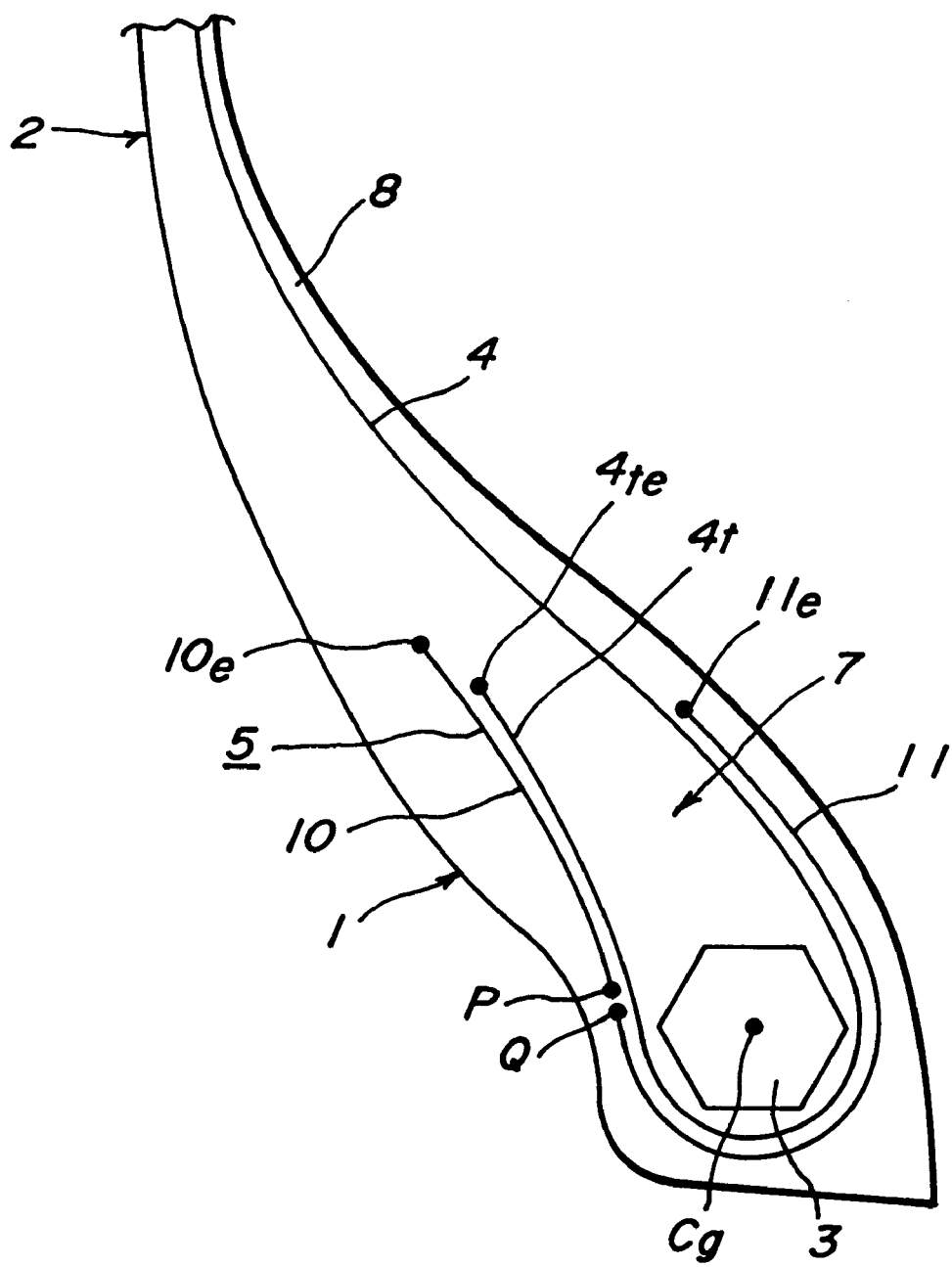
FIG. 6 is a diagrammatically section view of a main part of a third embodiment of the tire according to the second aspect of the invention.

The adjoining position of the opposed ends P, Q is located at an inside of the tire around the bead core in FIG. 4, at an outside of the tire around the bead core in FIG. 5, at an outside of the tire in the vicinity of the bead core in FIG. 6, at an outside of the tire around the bead core in FIG. 7, and at an outside of the tire around the bead core in FIG. 8, respectively.

According to the invention, it is required that the steel cords of the outer and inner reinforcing layers 10, 11 located at the outside and inside regions of the bead portion 1 and arranged in the vicinity of the outer ends 10e, 11e in the radial direction (outer end portion) have an inclination angle of 15–30° with respect to the circumferential line of the tire, while the steel cords arranged in the vicinity of the inner end of at least one of the outer and inner reinforcing layers 10, 11 in the radial direction or in at least one of the opposed ends P, Q thereof (inner end portion) have an inclination angle of 35–60° with respect to the circumferential line of the tire. In other words, the inclination angle of the steel cord arranged in the same layer is minimum at the outer end portion in the radial direction, and increases toward the opposed ends and is maximum at the vicinity of the opposed ends. The term "circumferential line of the tire" used herein means a circumferential line passing through a position specifying the inclination angle.

Such a distribution of the inclination angle in the steel cord can be obtained by subjecting both surfaces of uncured materials as the outer and inner reinforcing layers 10, 11 to a given quantity of a forcedly deforming work prior to the building-up of an uncured tire. For this end, there are coexistent a case of giving the difference of inclination angle to the steel cords arranged in at least one of the reinforcing layers 10, 11 by taking account of the tire productivity, and a case of giving the difference of inclination angle to both the reinforcing layers 10, 11 by taking account of the severity of use conditions.

The inclination angle of the steel cord arranged in the vicinity of outer end 10e, 11e or in the vicinity of opposed ends P, Q with respect to the circumferential line of the tire is defined by an acute angle among angles between tangent of the circumferential line and tangent of central axis of the cord at an intersect between the central axis of the cord and the circumferential line of the tire.

The aforementioned structure of the outer and inner reinforcing layers 10, 11 develops the following effects.

Firstly, when the inclination angle of the steel cord arranged in the vicinity of at least one of opposed ends P, Q with respect to the circumferential line of the tire is made larger within a range of 35–60°, the reinforcing layer portion around the bead core 3 can develop a large resisting force to the rotation r of the bead core 3 around the graphic center of gravity Cg at section (see FIG. 13) due to the pulling-out tension T acting to the carcass ply 4.

This resisting force develops an effect of preventing or largely mitigating the "settling" phenomenon of the bead core 3 inevitably produced in the bead portion together with the advance of the running distance in the conventional tire. As a result, a large plastic deformation of the bead portion 1 produced at the middle to last running stage of the tire is suppressed by the prevention or large mitigation of the "settling" phenomenon, which is possible to decrease strain applied to the outer end 10e of the outer reinforcing layer 10 in the radial direction and hence largely improve the resistance to separation failure. Moreover, the term "settling" means a phenomenon based on plastic deformation of an extremely thin coating rubber for steel wire required in the production of the bead core 3 having a hexagonal shape at section as a wound body of the steel wire as shown in the illustrated embodiment. The section of the bead core 3 may take various polygonal shapes in addition to the hexagonal shape.

When the inclination angle is less than 35°, the resisting force to the rotation r of the bead core 3 is too small and the "settling" can not sufficiently be suppressed, while when it exceeds 60°, since the steel cords are curved from the vicinity of the outer end 10e, 11e in the radial direction having an inclination angle of 15–30° toward the vicinity of the opposed ends P, Q to increase the inclination angle, the curved degree is too large and hence a large compression stress is repeatedly applied to the curved portion of the steel cord corresponding to the ground contact region during the running of the tire under loading and finally the cord breaking-up is liable to be caused.

Secondly, when the inclination angle of the steel cord arranged in the vicinity of the outer ends 10e, 11e of the outer and inner reinforcing layers 10, 11 in the radial direction is within a range of 15–30° with respect to the circumferential line of the tire, strain produced with deformations of the bead portion along the circumferential line of the tire corresponding to the stepping-in side and kicking-out side of the ground contact region and in the radial direction and applied to the vicinity of the outer ends 10e, 11e of the outer and inner reinforcing layers 10, 11 in the radial direction is made small during the running of the tire under loading. This can attain the remarkable improvement of the bead portion durability together with the above minimization of the plastic deformation of the bead portion.

Furthermore, the opposed ends of the outer and inner reinforcing layers 10, 11 are adjoined each other, whereby the fixation and restraint of the outer and inner reinforcing layers 10, 11 are loosened at the inflation of a tire-wheel assembly under a given air pressure and during the running of the tire under loading to decrease strain applied to the vicinity of the outer ends 10e, 11e of the outer and inner reinforcing layers 10, 11 in the radial direction. This largely contributes to improve the bead portion durability. That is, these three actions together can realize the bead portion durability equal to or more than that of the conventional tire having a heavy weight even when the winding number of the steel wires in the bead core 3 is decreased and the amount of rubber for the bead portion, e.g. rubber of the stiffener 7 is decreased to form a light weight tire. Numeral 8 is an innerliner, which is made from an air-impermeable rubber in case of the tubeless tire.

When the inner opposed ends P, Q of the outer and inner reinforcing layers 10, 11 in the radial direction are butted to each other, the action of restraining the movement of these layers 10, 11 is enhanced during the running of the tire under loading, which is more effective to suppress the "settling" of the bead core 3. Particularly, when the butting position is around the bead core 3, the control of the "settling" can efficiently be realized.

The inclining directions of the steel cords in the outer and inner reinforcing layers 10, 11 may be the same with each other with respect to the radius line of the tire. When such a tire is used by representing the rotating direction of the tire opposite to the above inclining direction of the steel cords to input torque from a constant direction, strain applied to the outer ends 10e, 11e of these layers 10, 11 can be mitigated and hence the invention can be utilized more advantageously. This is adaptable to tires for use in, for example, trucks running over a long distance.

On the other hand, the inclining directions of the steel cords in the outer and inner reinforcing layers 10, 11 may be opposite to each other with respect to the radius line of the tire. In this case, the rigidity of the bead portion 1 to the rotating direction of the tire is substantially the same and the indication of the rotating direction is useless. This is adaptable to tires for city bus having a high frequency of repeating start and stop.

In FIG. 7 is sectionally shown a main part of a tire-wheel assembly when a tubeless tire for truck and bus is assembled onto a 15° drop center rim (shown by only an outer profile) 20 and inflated under a maximum air pressure, while in FIG. 8 is sectionally shown a main part of a tire-wheel assembly when a tube-containing tire for truck and bus is assembled onto a wide-width flat base rim (shown by only an outer profile) 21 and inflated under a maximum air pressure. In these embodiments, positions of the opposed ends P, Q of the outer and inner reinforcing layers 10, 11 may be as follows.

In the embodiments of FIGS. 7 and 8, the opposed ends P, Q of the outer and inner reinforcing layers 10, 11 are located in a zone sandwiched between a straight line $L_1$ passing through the graphic center of gravity Cg in section of the bead core 3 and perpendicular to the rotating axis of the tire (not shown) and a normal line $L_2$ drawn from an outermost end A of a surface of the bead portion 1 contacting with a flange 20F, 21F of the rim 20, 21 in the radial direction to the carcass ply 4 facing the inside of the tire.

Except that the positions of the opposed ends P, Q in the embodiment of FIG. 4 are existent more inward from the above zone, these embodiments are similar to those of FIGS. 5 and 6, which can particularly mitigate the restraint force to the outer reinforcing layer 10 located at the outside of the bead portion and are excellent in the followability to the deformation of the outer portion of the outer reinforcing layer 10 in the radial direction during the running of the tire under loading and more decrease strain applied to the vicinity of the outer end 10e of the outer reinforcing layer 10 in the radial direction.

In the embodiments of FIGS. 9 and 10, the opposed ends of the outer and inner reinforcing layers 10, 11 are largely widened and the middle reinforcing layer 12 is disposed in the widened region between the opposed ends. The steel cords arranged at the outer ends 10e, 11e of the outer and inner reinforcing layers 10, 11, which are located at the outside and inside of the bead portion 1 sandwiching the bead core 3 therebetween, have an inclination angle of 15–30° with respect to the circumferential line of the tire and the steel cords arranged at the inner ends P, R of the outer and inner reinforcing layers 10, 11 have an inclination angle of 35–60° with respect to the circumferential line of the tire, which are the same as in the embodiments of FIGS. 4–8. On the other hand, the steel cords arranged in the middle reinforcing layer 12 around the bead core 3 between the outer and inner reinforcing layers 10 and 11 have an inclination angle larger than the inclination angle of the steel cord in the above inner ends P, R (35–60°) but not more than 90°. In these reinforcing layers 10, 11 and 12, the position relation and adjoining relation between the opposed ends P and Q and between the opposed ends R and S are the same as previously mentioned.

In the embodiments of FIGS. 9 and 10, it is not required to subject the steel cords arranged in each of the outer, inner and middle reinforcing layers 10, 11, 12 to a forming deformation work, so that the number of steps can be decreased, but the number of the layer materials is increased and hence the number of steps is substantially the same as in the embodiments of FIGS. 4–8. The function and effect relating to the outer and inner reinforcing layers are the same as in the embodiments of FIGS. 4–8, but the restraint force acting to the outer and inner reinforcing layers 10, 11 in the embodiments of FIGS. 9 and 10 is mitigated, so that the degree of freedom in the design of setting the positions of inner ends P, R of the layers 10, 11 in the radial direction is increased. Therefore, the division of the bead portion reinforcing layer into three layer segments has a merit of more facilitating the improvement of the bead portion durability.

And also, the steel cords in at least two of the outer, inner and middle reinforcing layers 10, 11 and 12 may be arranged in the same inclining direction with respect to the radius line of the tire. In this case, the function, effect and application are the same as previously mentioned.

Figure 11:
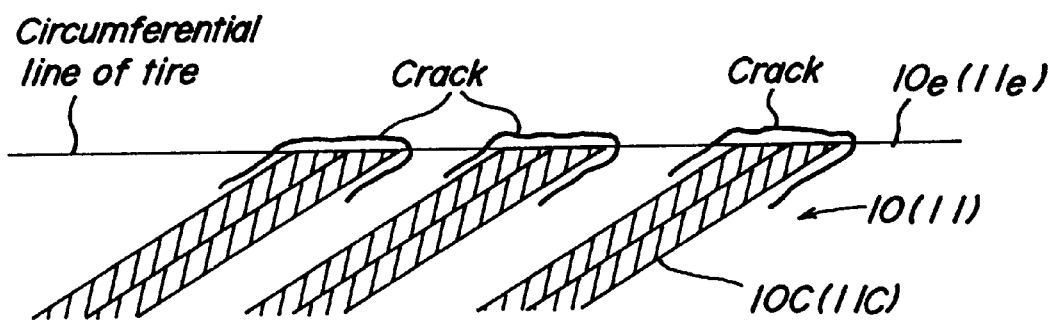
FIG. 11 is a schematic view illustrating an arrangement and function of cord groups as a bead portion reinforcing cord layer in an embodiment of the tire according to the invention.
Figure 12:
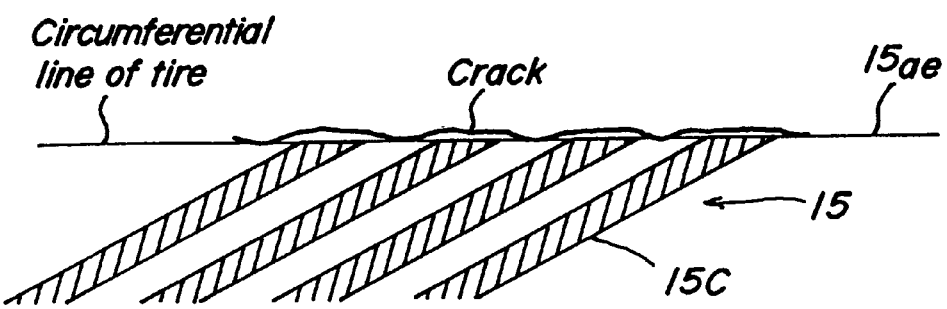
FIG. 12 is a schematic view illustrating a propagation of cracks in the arrangement of cords for the bead portion reinforcing layer of the conventional tire.

In the above embodiments, it is desirable that the steel cords arranged in at least one of the outer, inner and middle reinforcing layers 10, 11, 12, desirably the outer reinforcing layer 10 have a cord group 10C (11C) of arranging two or more cords (two cords in the illustrated embodiment) side by side as shown by a developed view in FIG. 11 (in a direction of spreading the surface of the layer). In FIG. 12 is developedly shown a behavior of arranging steel cords in the conventional reinforcing layer likewise FIG. 11.

In the conventional reinforcing layer 15 are arranged steel cords 15C on each, so that crack created on an end 15ae of the steel cord 15C is liable to be connected substantially along the circumferential line of the tire as shown in FIG. 12. Once the cracks are connected to each other, they come to separation failure at a relatively premature stage. On the contrary, in case of the cord group 10C (11C), if the end count (e.g. cords per 5 cm) is the same as in the conventional reinforcing layer 15, the distance between cords (space between cords is filled with a coating rubber) is wider by about 2 times than that of the conventional reinforcing layer and also the rigidity of the cord group 10C (11C) is higher than that of the single cord, so that cracks grows along the longitudinal direction of the cord group 10C (11C) as shown in FIG. 11 and the connection of cracks as shown in FIG. 12 hardly occurs and the occurrence of separation failure is not easily caused. Therefore, the use of the cord group 10C (11C) is particularly advantageous in the invention.

Furthermore, it is favorable that 100% modulus of a coating rubber for steel cords in the outer reinforcing layer 10 located at the outside of the bead portion 1 (may include the middle reinforcing layer 12 in accordance with the arrangement) among the outer, inner and middle reinforcing layers 10, 11, 12 is smaller than that of a coating rubber for the carcass ply 4. Because the deformation of the bead portion 1 is substantially a constant strain deformation during the running of the tire under loading, when the above relation of 100% modulus is applied to the coating rubber for at least outer reinforcing layer 10, stress becomes smaller and hence the occurrence of cracks at the end 10e of the outer reinforcing layer 10 most liable to create the cracks among the above reinforcing layers can be controlled to largely contribute to the improvement of the bead portion durability.

And also, it may be effective to additionally add the organic fiber cord layer 6 shown by dotted lines in FIG. 5 so as to cover the outer surfaces of the outer and inner reinforcing layers 10, 11. Particularly, it is favorable to arrange the layer 6 so as to exceed upward over an outer end 10e of the outer reinforcing layer 10 in the radial direction. This is recommended in tires used under a severe condition input to the bead portion 1 (load and running speed) and in tires requiring many recapping number. Moreover, the belt reinforcing the tread portion on the outer periphery of the carcass ply 4 is comprised of two or more cross steel cord layers.

The following examples are given in illustration of the invention and are not intended as limitations thereof.

Examples 1–8, Comparative Examples 1–3

There are provided eight tires for truck and bus having a tire size of 11/70R22.5 and a bead portion structure as shown in FIG. 1 as Examples 1–8, each of which comprises a carcass 4 of a single rubberized steel cord ply and is provided with a single wire chafer 5. In order to achieve light weight and low cost, the winding number of steel wire $3w$ in the bead core 3 is rendered into 65 turns by decreasing 7 turns from the conventional 72 turns and the quantity of rubber used in the stiffener 7 is decreased accompanied therewith to decrease the tire weight by about 0.40 kg as compared with that of the conventional tire.

In order to verify the effect of these examples, there are three tires for Comparative Examples 1–3. Comparative Example 1 is a tire provided with the single conventional wire chafer, and Comparative example 2 is a tire in which steel cords existing in the wire chafer along a turnup portion of the carcass ply have a difference of inclination angle similar to that of the example (tire having a structure disclosed in JP-B-1-26884), and Comparative Example 3 is a tire in which inclination angles of cords in the wire chafer and cords in the turnup portion of the carcass ply are gradually decreased outward from the bead core in the radial direction with respect to the circumferential direction of the tire and inclining directions of these cords are opposite to each other and crossed with each other (tire having a structure disclosed in JP-B-5-2521). The other structure of these three tires is the same as in the example.

With respect to the tires in Examples 1–8 and Comparative Examples 1–3, inclination angles $\alpha_{OE}$, $\alpha_{IE}$ at ends $5_{OE}$, $5_{IE}$ and inclination angles $\beta_O$, $\beta_I$ in the vicinity of straight line L in the wire chafer 5, and ratio $M_{100W}/M_{100C}$ of 100% modulus of a coating rubber $M_{100W}$ (kgf/cm$^2$) for the wire chafer 5 to 100% modulus of coating rubber $M_{100C}$ (kgf/cm$^2$) for the carcass 4 are shown in Table 1. The tire weight in each of Examples 1–8 and Comparative Examples 1–3 is 52 kg. Moreover, Examples 6–8 are the same as in Example 1 except for the ratio $M_{100W}/M_{100C}$.

Each tire of Examples 1–8 and Comparative Examples 1–3 is assembled onto a rim of 7.50×22.5 having a width narrower than a standard rim as an approved rim and inflated under a maximum air pressure of 8.5 kgf/cm$^2$ corresponding to a maximum load capacity (single) of 2725 kg and then pushed onto a drum of 1.7 m in diameter rotating at a speed of 60 km/h under a load of 5000 kg to conduct a test for evaluating bead portion durability. The evaluation is carried out by measuring a running distance until the occurrence of separation failure in the bead portion and represented by an index on the basis that Comparative example 2 is 100. The larger the index value, the better the bead portion durability. The test results are also shown in Table 1.

TABLE 1

|  | Comparative Example | | | Example | | | | | | | |
| --- | --- | --- | --- | --- | --- | --- | --- | --- | --- | --- | --- |
|  | 1 | 2 | 3 | 1 | 2 | 3 | 4 | 5 | 6 | 7 | 8 |
| Inclination angle $\alpha_{OE}$ | 30 | 18 | 38 | 30 | 30 | 22 | 34 | 30 | 30 | 30 | 30 |
| Inclination angle $\alpha_{IE}$ | 30 | 18 | 38 | 30 | 30 | 22 | 34 | 30 | 30 | 30 | 30 |
| Inclination angle $\beta_O$ | 30 | 30 | 50 | 60 | 35 | 27 | 39 | 45 | 60 | 60 | 60 |
| Inclination angle $\beta_I$ | 30 | 30 | 50 | 60 | 35 | 27 | 39 | 45 | 60 | 60 | 60 |
| $M_{100W}/M_{100C}$ | 1.0 | 1.0 | 1.0 | 0.6 | 1.0 | 1.0 | 1.0 | 0.9 | 0.8 | 0.9 | 1.0 |
| Running distance (index) | 95 | 100 | 70 | 130 | 120 | 143 | 105 | 110 | 140 | 135 | 130 |

As seen from Table 1, the bead portion durability does not arrive at a level satisfying a commercial demand in Comparative Example 2, while the bead portion durability of Comparative Example 1 does not amount to the level of Comparative Example 2 because the volume of the bead portion is lacking. In Comparative Example 3, a large strain is applied to the vicinity of the end of the wire chafer to cause the separation failure and also the bead portion durability is considerably poor as compared with that of Comparative example 1. In any case, the tires of Comparative Examples 1–3 are lacking in the practicality. On the contrary, the tire of Example 3 has just a bead portion durability satisfying the commercial demand, while the tires of the remaining examples develop satisfactory bead portion durability.

Examples 9–18, Comparative Example 4

There are provided ten tires for truck and bus having a tire size of 11/70R22.5 and a bead portion structure as shown in FIGS. 4, 5, 7 or 9 as Examples 9–18, each of which comprises a carcass 4 of a single rubberized steel cord ply and a belt of four cross steel cord layers. As a bead core 3 is used so-called hexagonal bead core as shown in these figures, wherein the winding number of steel wire having a gauge No. 15 is decreased from the conventional 72 turns to 65 turns. Therefore, the weight is decreased by about 0.4 kg only by such a bead core 3. Furthermore, the weight of a stiffener 7 is decreased by 0.3 kg, so that the tire weight is reduced by about 0.7 kg as compared with that of the conventional tire.

In the tires of Examples 9–17, an outer reinforcing layer 10 and an inner reinforcing layer 11 are arranged as a bead portion reinforcing layer according to FIGS. 4, 5 and 7, while in the tire of Example 18, an outer reinforcing layer 10, an inner reinforcing layer 11 and a middle reinforcing layer 12 are arranged as a bead portion reinforcing layer according to FIG. 9. Inclination angles of steel cord arranged in the vicinity of outer ends 10e, 11e of the reinforcing layers 10, 11 in the radial direction and in the vicinity of opposed ends P, R and Q, S of the reinforcing layers 10, 11 and 12 with respect to the circumferential line of the tire are shown in Table 2 together with the inclining direction of the cord viewed from a side of the tire and represented by R and L in which symbol R means upward to the right and symbol L means upward to the left.

In Comparative example 4, the same light weight bead core 3 as in Example 9 is used and two steel cord layers 15a, 15b shown in FIG. 13 are used as a bead portion reinforcing layer, which corresponds to a tire described in JP-A-59-216709. The positions of the outer ends 15ae and 15be of these layers are the same as in Example 9.

Each tire of Examples 9–18 and Comparative Example 4 is assembled onto an acceptable rim of 7.50×22.5 as an approved rim defined in JATMA standard (1997) and inflated under a maximum air pressure of 8.5 kgf/cm$^2$ and then pushed onto a drum of 1.7 m in diameter rotating at a speed of 60 km/h under a load of 5000 kg (maximum load capacity in the above standard is 2725 kg in a single tire assembling and 2500 kg in a dual tire assembling) to conduct a test for evaluating bead portion durability. The evaluation is carried out by measuring a running distance until the occurrence of separation failure in the bead portion and represented by an index on the basis that Comparative example 4 is 100. The larger the index value, the better the bead portion durability. The test results are also shown in Table 2.

TABLE 2

|  | Comparative | Example | | | | | | | | | |
|---|---|---|---|---|---|---|---|---|---|---|---|
|  | Example 4 | 9 | 10 | 11 | 12 | 13 | 14 | 15 | 16 | 17 | 18 |
| Corresponding figure | FIG. 13 | FIG. 4 | FIG. 7 | FIG. 7 | FIG. 7 | FIG. 7 | FIG. 7 | FIG. 7 | FIG. 4 | FIG. 5 | FIG. 9 |
| Inclination angle at outer end 10e | R30 | R30 | R25 | R20 | R25 | R16 | R20 | R20 | R20 | R20 | R30 |
| Inclination angle at opposed ends P, R | R30 | R30 | R25 | R20 | R25 | R16 | R60 | R60 | R60 | R60 | R60 |
| Inclination angle at outer end 11e | L30 | R30 | R25 | R20 | L25 | L16 | R20 | R20 | R20 | R20 | R30 |
| Inclination angle at opposed ends Q, S | L30 | R35 | R45 | R60 | L45 | L58 | R60 | R20 | R20 | R60 | R70 |
| Running distance (index) | 100 | 105 | 110 | 125 | 120 | 115 | 130 | 118 | 123 | 130 | 135 |

As seen from Table 2, the improvement of the bead portion durability is attained by about 5% even in the tire of Example 9 having a distribution of inclination angle similar to that of the comparative example, while in the tires of the remaining examples, the bead portion durability is considerably improved as the distribution of inclination angle becomes apart from that of the comparative example.

As mentioned above, according to the invention, there can be provided a heavy duty pneumatic radial tire having a light weight and capable of developing a bead portion durability equal to or more than that of the conventional tire having a heavy weight even when a weight of the bead portion based on the volume (weight) of the bead core is decreased irrespectively of the dimension of aspect ratio.

What is claimed is:

1. A heavy duty pneumatic radial tire comprising a carcass of one or more rubberized cord plies extending between a pair of bead cores each embedded in a bead portion and containing cords arranged along a plane inclusive of a rotating axial center of the tire, at least one of which plies being wound around the bead core in each bead portion from an inside of the tire toward an outside thereof to form a turnup portion, and a bead portion reinforcing layer comprised of separately independent rubberized steel cord layer segments covering the at least one carcass ply inclusive of its turnup portion in the bead portion, in which said bead portion reinforcing layer is comprised of three independent rubberized steel cord layer segments consisting of an inner reinforcing layer segment arranged at an inside region side the carcass ply facing the inside of the tire, an outer reinforcing layer segment arranged at an outside region side of the turnup portion of the carcass ply, and a middle reinforcing layer segment arranged around the bead core between the inner reinforcing layer segment and the outer reinforcing layer segment, and an outer end of the outer reinforcing layer segment in the radial direction extends over an end of the turnup portion of the carcass ply, and opposed ends among the three rubberized steel cord layer segments are arranged so as to be adjacent to each other in the vicinity of the bead core, and an inclination angle of steel cords in the bead portion reinforcing layer with respect to a circumferential line of the tire is within a range of 15–30° at an outer end portion of each of the outer and inner reinforcing layer segments in the radial direction of the tire and within a range of 35–60° at an inner end portion thereof and an inclination angle of steel cords in the middle reinforcing layer segment is made larger than the inclination angle of steel cords at the inner end portion of each of the above outer and inner reinforcing layer segments.

2. A heavy duty pneumatic radial tire according to claim 1, wherein the steel cords in at least two reinforcing layer segments among the three reinforcing layer segments as the bead portion reinforcing layer are arranged in the same inclining direction with respect to a radius line of the tire.

3. A heavy duty pneumatic radial tire according to claim 1, wherein a group of arranging two reinforcing or more steel cords side by side is used as a steel cord in at least one layer segment among the three reinforcing layer segments as the bead portion reinforcing layer.

4. A heavy duty pneumatic radial tire according to claim 1, wherein a coating rubber for steel cords in a reinforcing layer segment arranged in at least the outer region of the bead portion has 100% modulus smaller than that of a coating rubber for cords in the carcass ply.

5. A heavy duty pneumatic radial tire according to claim 1, wherein at least one organic fiber cord layer is arranged so as to cover an outer surface of the bead portion reinforcing layer.

* * * * *